United States Patent
Ferreira et al.

(10) Patent No.: US 12,361,315 B2
(45) Date of Patent: Jul. 15, 2025

(54) FAST CONVERGING GRADIENT COMPRESSOR FOR FEDERATED LEARNING

(71) Applicant: EMC IP Holding Company LLC, Hopkinton, MA (US)

(72) Inventors: Paulo Abelha Ferreira, Rio de Janeiro (BR); Pablo Nascimento da Silva, Niterói (BR); Tiago Salviano Calmon, Rio de Janeiro (BR); Roberto Nery Stelling Neto, Rio de Janeiro (BR); Vinicius Michel Gottin, Rio de Janeiro (BR)

(73) Assignee: EMC IP HOLDING COMPANY LLC, Hopkinton, TX (US)

( * ) Notice: Subject to any disclaimer, the term of this patent is extended or adjusted under 35 U.S.C. 154(b) by 1097 days.

(21) Appl. No.: 17/154,243

(22) Filed: Jan. 21, 2021

(65) Prior Publication Data

US 2022/0230092 A1 Jul. 21, 2022

(51) Int. Cl.
   *G06N 20/00* (2019.01)
   *G06N 3/08* (2023.01)
   *H04L 67/10* (2022.01)

(52) U.S. Cl.
   CPC ............ *G06N 20/00* (2019.01); *G06N 3/08* (2013.01); *H04L 67/10* (2013.01)

(58) Field of Classification Search
   CPC .................................. G06N 3/08; G06N 20/00
   See application file for complete search history.

(56) References Cited

U.S. PATENT DOCUMENTS

2021/0374502 A1* 12/2021 Roth .................. G06N 3/08
2022/0261433 A1* 8/2022 Zhang ............ H03M 7/3059

OTHER PUBLICATIONS

Wang, "Adaptive Federated Learning in Resource Constrained Edge Computing Systems", IEEE, 2019 (Year: 2019).*
Kadhe, "FastSecAgg: Scalable Secure Aggregation for Privacy-Preserving Federated Learning", IEEE, 2020 (Year: 2020).*

* cited by examiner

*Primary Examiner* — Van C Mang
(74) *Attorney, Agent, or Firm* — Chamberlain, Hrdlicka, White, Williams & Aughtry; Aly Z. Dossa

(57) ABSTRACT

Method for model updating in a federated learning environment, including distributing a current model to client nodes; receiving a first set of gradient sign vectors, wherein each gradient sign vector of the first set of gradient sign vectors is received from one client node; generating a first updated model based on the first set of gradient sign vectors; distributing the first updated model to the plurality of client nodes; storing a first shape parameter and a second shape parameter; receiving, in response to distributing the first updated model, a second set of gradient sign vectors, wherein each gradient sign vector of the second set of gradient sign vectors is received from one client node; generating a second updated model based on the second set of gradient sign vectors, the first shape parameter, and the second shape parameter; and distributing the second updated model to the plurality of client nodes.

20 Claims, 4 Drawing Sheets

FAST CONVERGING GRADIENT COMPRESSOR FOR FEDERATED LEARNING

BACKGROUND

Computing devices often exist in environments that include many such devices (e.g., servers, virtualization environments, storage devices, mobile devices network devices, etc.). Machine learning algorithms may be deployed in such environments to, in part, assess data generated by or otherwise related to such computing devices. Such algorithms may be applied to data that cannot or should not be transmitted beyond the boundaries of the environment. Such constraints on data transmission may reduce or prevent machine-learning algorithms deployed in the environment from benefitting from training of the algorithm in other environments.

SUMMARY

In general, embodiments described herein relate to a method for model updating in a federated learning environment. The method may include distributing, by a model coordinator, a current model to a plurality of client nodes; receiving, by the model coordinator and in response to distributing the current model, a first set of gradient sign vectors, wherein each gradient sign vector of the first set of gradient sign vectors is received from one client node of the plurality of client nodes; generating, by the model coordinator, a first updated model based on the first set of gradient sign vectors; distributing the first updated model to the plurality of client nodes; storing, by the model coordinator, a first shape parameter and a second shape parameter; receiving, by the model coordinator and in response to distributing the first updated model, a second set of gradient sign vectors, wherein each gradient sign vector of the second set of gradient sign vectors is received from one client node of the plurality of client nodes; generating, by the model coordinator, a second updated model based on the second set of gradient sign vectors, the first shape parameter, and the second shape parameter; and distributing the second updated model to the plurality of client nodes.

In general, embodiments described herein relate to a non-transitory computer readable medium that includes computer readable program code, which when executed by a computer processor enables the computer processor to perform a method for model updating in a federated learning environment. The method may include distributing, by a model coordinator, a current model to a plurality of client nodes; receiving, by the model coordinator and in response to distributing the current model, a first set of gradient sign vectors, wherein each gradient sign vector of the first set of gradient sign vectors is received from one client node of the plurality of client nodes; generating, by the model coordinator, a first updated model based on the first set of gradient sign vectors; distributing the first updated model to the plurality of client nodes; storing, by the model coordinator, a first shape parameter and a second shape parameter; receiving, by the model coordinator and in response to distributing the first updated model, a second set of gradient sign vectors, wherein each gradient sign vector of the second set of gradient sign vectors is received from one client node of the plurality of client nodes; generating, by the model coordinator, a second updated model based on the second set of gradient sign vectors, the first shape parameter, and the second shape parameter; and distributing the second updated model to the plurality of client nodes.

In general, embodiments described herein relate to a system for model updating in a federated learning environment. The system may include a model coordinator, executing on a processor comprising circuitry, and configured to: distribute a current model to a plurality of client nodes; receive, in response to distributing the current model, a first set of gradient sign vectors, wherein each gradient sign vector of the first set of gradient sign vectors is received from one client node of the plurality of client nodes; generate a first updated model based on the first set of gradient sign vectors; distribute the first updated model to the plurality of client nodes; store a first shape parameter and a second shape parameter; receive, in response to distributing the first updated model, a second set of gradient sign vectors, wherein each gradient sign vector of the second set of gradient sign vectors is received from one client node of the plurality of client nodes; generate a second updated model based on the second set of gradient sign vectors, the first shape parameter, and the second shape parameter; and distribute the second updated model to the plurality of client nodes.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
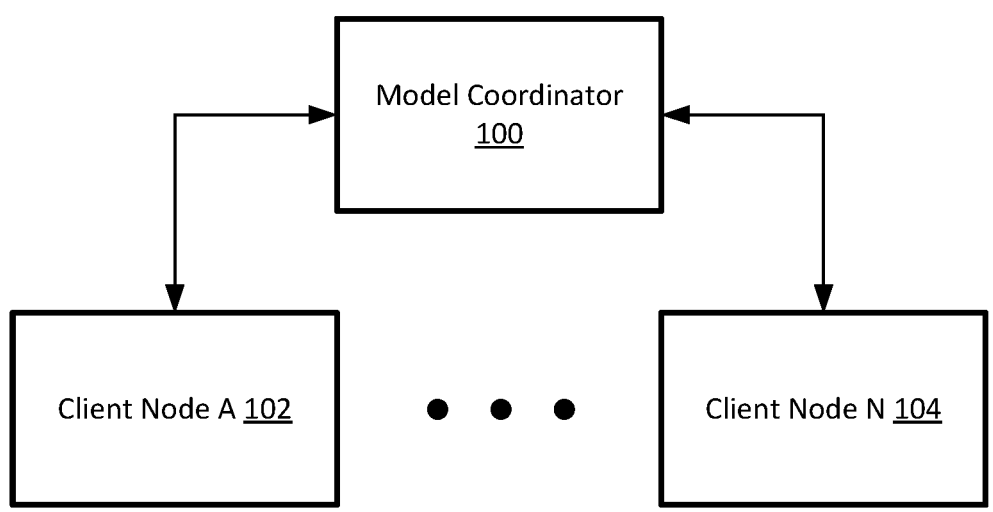
FIG. 1A shows a diagram of a system in accordance with one or more embodiments of the invention.

Specific embodiments will now be described with reference to the accompanying figures.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for training models (e.g., machine learning algorithms) using, and that will be used by, various nodes that are operatively connected to a model coordinator. In one or more embodiments, a node (e.g., a client node) is any set of one or more computing devices (or portions therein) that are operatively connected to one another, on which one or more models are being used to predict outputs/outcomes based on input data.

There may be any amount of such input data organized in any way to contribute to variables/factors that may be assessed or otherwise used by a model. In one or more embodiments, prior to using a given version of a model, the model must be trained using a training data set. In one or more embodiments, a training data set exists on and/or is otherwise obtained by client nodes that relates to a given set of one or more outcomes that are to be predicted. For example, a given client node may have data relating to facial recognition, software use, browsing behavior, storage device performance, storage backup performance, mobile device use, battery life, self-driving automobile data, etc.

In one or more embodiments, a model coordinator is operatively connected to any number of client nodes, each having a data set for which a given model may be relevant. In one or more embodiments, a model coordinator may distribute a model to any or all of the client nodes to be trained using data present on or otherwise available to the client nodes. For example, each node may have available a data set that includes inputs coupled to resulting outputs that are known to be correct. At least a portion of such a data set for a given client node may be used to train a model (e.g., machine learning algorithm) to more correctly predict any number of outputs based any number of inputs (e.g., future inputs for which the output is not already known). For example, if the node is arranged as neural network with any number of layers, a backpropagation algorithm may be used, such as a gradient descent algorithm, to train the neural network to predict future outcomes based on future inputs.

In such an algorithm, an initial model is used to set initial weights assigned to interconnections between components in different layers of the network. In one or more embodiments, the training data will be used with the algorithm starting at the output layer, and propagating back through the network one layer at a time until the input layer is reached, calculating the gradients (e.g., derivatives) along the way, which are used to inform the weights assigned to the variables/factors of the function being analyzed by the algorithm.

In one or more embodiments, the outcome of such training is a gradient vector, with a value (i.e., a gradient, which may be considered a partial derivative of the function for a given variable/factor) corresponding to each variable arranged as a vector. In one or more embodiments, each variable gradient value is located at a specific place (i.e., index location) within the gradient vector, and may be a positive or negative value.

In one or more embodiments, training of a model within a given client node may result in a model that fits well for the data set of that node, but that may not generalize as well to data sets for which the outcome is not already known and/or are available to other client nodes. In one or more embodiments, such a scenario is referred to as overfitting. Accordingly, it may be advantageous to aggregate the results from a number of different client nodes using the same model for their own data sets to determine a model that generalizes well to new data sets related to the same problem or data type.

In one or more embodiments, such an aggregated model may be achieved via a federated learning model. In one or more embodiments, in a federated learning model, a model coordinator operatively connected to each client node in the federation of client nodes receives the results of the training from the client nodes, and uses the aggregate set of results to update a central model, which is then re-distributed to the client nodes for further training and/or use. In one or more embodiments, the process is repeated until a given training session is complete, and each client node has a copy of the model produced by the model coordinator during the training session. In one or more embodiments, the use of training results from more than one client node increases the likelihood that the resulting model will be able to correctly predict outputs for a set of future inputs obtained by each client node. Said another way, the resulting model will generalize well.

In one or more embodiments, the client nodes are each provided with a current model from the model coordinator (which may be randomized if the cycle is an initial cycle). Each client node receiving the current model from the model coordinator may then train the model using its own local training data. In one or more embodiments, the results of the training of each nodes are gradient vectors.

However, certain scenarios may exist where the actual values of a gradient vector produced from a model training cycle on a given one or more client nodes cannot (or should not) be shared with the model coordinator. Examples of such scenarios include, but are not limited to, low network bandwidth, data privacy concerns, energy constraints, etc. Additionally, the model training results from any given client node may detract from the ability of the updated model generated by the model coordinator to generalize to future data sets as a result of overfitting to the training data set of the client node.

In one or more embodiments, instead of transmitting a gradient vector to the model coordinator, each client compresses the amount of information to be transmitted to the model coordinator by transforming its gradient vector into a gradient sign vector. In one or more embodiments, a gradient sign vector uses a single bit to represent the sign, positive or negative, of each gradient in the gradient vector. As an example, zero may be used to represent a negative gradient value, and one may be used to represent a positive gradient value. In one or more embodiments, if the gradient value is exactly zero, one can be used to represent the zero value. Said another way, in one or more embodiments, the test for a value to become a bit value of one is: [Bit value is one] when [gradient value is greater than or equal to one]. Thus, the gradient sign vector is a vector that includes single bit values of zero or one at each vector index position.

In one or more embodiments, a gradient sign vector effectively eliminates the transmission of any data from the client nodes, and instead the model coordinator only receives a portion of the results of the training of the model on the client nodes. Additionally, transmission of the signs of values rather than the actual values reduces the amount of data being sent, and thereby the network bandwidth necessary to transmit the results. For example, if a gradient vector included 1,000,000 gradients, and each were transmitted represented using a 32 bit value, then 32,000,000 bits of information would be transmitted to the model coordinator from a given client node. If, instead, a single bit representing the sign of the value was transmitted (e.g., 0 for negative and 1 for positive), then the number of bits transmitted to the model coordinator from a given client node is reduced by a factor of 32.

In one or more embodiments, such a compression scheme may be referred to as sign compression. In one or more embodiments, sign compression reduces the amount of information being transmitted, and results in a similar or at least acceptable level of prediction accuracy as the actual gradient vector having been sent.

In one or more embodiments, the client nodes transmit the gradient sign vectors to the model coordinator. In one or more embodiments, the model coordinator aggregates the model updates and uses them to generate an updated model. In one or more embodiments, one such execution of federated learning is referred to as a cycle. In one or more embodiments, the training continues for a pre-defined number of cycles, or until some level of correct outcome prediction ability is achieved. In one or more embodiments, the set of cycles is a training session for the model, which may also be referred to as an epoch.

In one or more embodiments, the gradient sign vectors from the client nodes are received by the model coordinator. In one or more embodiments, the model coordinator applies a scaling factor to the signs of the gradient sign vectors. The scaling factor may be pre-determined, and may be based, at least in part on the type of data relevant to the model being trained. For example, a set of values representing positive and negative gradients of a given gradient vector may have a scaling factor of 0.1 applied, thereby making each value negative 0.1 or positive 0.1.

In one or more embodiments, the model coordinator then takes the scaled value at each index position within the vector from each of the scaled gradient sign vectors, and determines an average value for the set of scaled values at each index position. In one or more embodiments, the resulting set of averages for each index position represent an updated model, which may be distributed to the client nodes for continued training, or for use if the training has completed (e.g., the epoch has ended).

When performing federated learning, there are at least two factors that are important factors in assessing how well the learning is performing One factor is strong generalization. A good federating learning scheme will tend to produce a model that will generalize well to more correctly predict outcomes based on previously unseen inputs. Another factor is the convergence time. Convergence time may be considered the time (e.g., number of cycles, epochs, etc.) it takes to train a model to an acceptable level of performance, such as predicting outcomes within an error range. Achieving faster convergence is advantageous for a variety of reasons. One such reason, especially in a federated learning environment, is that faster convergence time means less resources and/or time are required to be used by client nodes to train the model before obtaining a model that can be used to predict whatever outcome(s) are to be predicted via use of the trained model.

Embodiments described herein may improve generalization over existing federated learning techniques, while at the same time demonstrating faster convergence times. In one or more embodiments, these goals are achieved by treating each gradient in a gradient vector as an independent Bernoulli trial, and using a set of such trials, one from each client node for each gradient, as part of a Bayesian Beta-Bernoulli model.

In one or more embodiments, a model coordinator in a federated learning environment distributes an initial model to a set of client nodes. In one or more embodiments, each client node trains the model using a data set available to the client node. In one or more embodiments, the result of the training is a gradient vector. In one or more embodiments, each client node then compresses the gradient vector to a gradient sign vector, and transmits the same to the model coordinator. In one or more embodiments, after receiving the gradient sign vectors from the client nodes, the model coordinator decodes the gradient sign vectors to have real positive or negative numbers for each gradient vector index position from each client node. In one or more embodiments, after decoding, for a given index position within the gradient vector, the model coordinator has a set of gradient sign values. In one or more embodiments, the model coordinator uses the set of values to determine a mean value for each index position of the vector. The result is an updated model, which is then distributed to the client nodes for use in the next training cycle.

In one or more embodiments, the model coordinator also stores two shape parameter values. In one or more embodiments, a shape parameter is a value that determines, at least in part, the shape of a curve representing the probability distribution of the signs of the gradients produced by the client nodes for a given vector index position. In one or more embodiments, a Beta distribution is parameterized by two shape parameters, $\alpha$ and $\beta$. In one or more embodiments, these two shape parameters may be used, along with the results of the next cycle of training, to determine an expected value for each index position in the next updated model, instead of merely performing the same determination of a mean value for each index position. Said another way, embodiments described herein use the shape parameters from the previous cycle (i.e., prior shape parameters) when generating an updated model after a current cycle, and for updating the shape parameters based on the current cycle (i.e., posterior shape parameters), which become the prior shape parameters for the next cycle.

Updated shape parameters may be determined using prior shape parameters and the positive and negative values represented by the gradient sign vector values at a given index position within the gradient sign vectors received from the client nodes. In one or more embodiments, updated shape parameters for a Beta distribution may be calculated as follows:

$$\alpha_p = \alpha_r + S_1$$

$$\beta_p = \beta_r + S_0$$

where:
$\alpha_p$=the updated (i.e., posterior) a shape parameter value;
$\beta_p$=the updated (i.e., posterior) 13 shape parameter value;
$\alpha_r$=the $\alpha$ value from the previous cycle (i.e., prior);
$\beta_r$=the $\beta$ value from the previous cycle (i.e., prior);
$S_1$=the number of values of a given sign (e.g., positive) within the set of values for a given gradient sign vector index position (e.g., the "ones");
$S_0$=the number of values of the other sign (e.g., negative) within the set of values for a given gradient sign vector index position (e.g., the "zeros"); and
$N=S_0+S_1$=the total number of values used at a given vector index position from the gradient sign vectors from the client nodes In one or more embodiments, updating the shape parameters based on the prior shape parameters and the current cycle results may be referred to as a Bayesian update. In one or more embodiments, the results of the Bayesian update may be used to determine a value (shown below as $\theta$) at a given index position to use in a model update based on the last cycle of training performed, as shown by the following calculation:

$$\theta = (\alpha_p - 1)/(\alpha_p + \beta_p - 2)$$

using the equations above for $\alpha_p$ and $\beta_p$ and $N=S_0+S_1$ $$\theta = (\alpha_r + S_1 - 1)/(\pi_r + \beta_r + N - 2)$$

In one or more embodiments, after the first cycle, the model coordinator uses a value of one for both $\alpha_r$ and $\beta_r$ for all gradient vector index positions to calculate the values at each index position for an updated model. In one or more embodiments, using shape parameter values of one and the above equation for $\theta$ yields $\theta = S_1/N$, which may be referred to as the maximum likelihood estimation (MLE) of a given sign value (e.g., positive). The expected value for the actual value for the index position may be calculated as $(2 \times \theta) - 1$.

In one or more embodiments, for the next cycle, the number of instances of one sign (e.g., positive) $S_1$ is added to one (the $\alpha$ used with the results of the first cycle) and the number of instances of the other sign (e.g., negative) is added to one (the $\beta$ used with the results of the first cycle) to become $\alpha_p$ and $\beta_p$, which are used to calculate a new value (i.e., $\theta$) for an index position within the new model update to be distributed to the client nodes. In one or more embodiments, the calculation is performed for each index position within the gradient sign vectors to produce expected values for the new model update. In one or more embodiments, this calculation is repeated for each subsequent cycle, using the results of the cycle (i.e., the gradient sign vectors) and the $\alpha$ and $\beta$ values from the previous cycle to continue producing new model updates.

In one or more embodiments, faster convergence may be achieved by introducing a limit on the number of Bayesian updates performed in this matter before re-setting the $\alpha$ and $\beta$ values to one. For example, a Bayesian update for a set of ten cycles may be performed, and then the process begins again by using $\alpha$ and $\beta$ values of one for the $11^{th}$ cycle, thereby starting a new set of ten cycles. In one or more embodiments, the process continues until a training epoch completes.

In one or more embodiments, using a sign compression scheme achieves a reduction in amount of data being transferred, as well as eliminating the need to transmit actual data from the client nodes (e.g., the actual gradient values). In one or more embodiments, applying a Bayesian update scheme based on the gradient sign vectors received from the client nodes achieves stronger generalization and faster compression than merely using sign compression with mean aggregation techniques.

FIG. 1A shows a diagram of a system in accordance with one or more embodiments described herein. The system may include a model coordinator (100) operatively connected to any number of client nodes (e.g., client node A (102), client node N (104)). Each of these components is described below.

In one or more embodiments, the client nodes (102, 104) may be computing devices. In one or more embodiments, as used herein, a client node (102, 104) is any computing device, collection of computing devices, portion of one or more computing devices, or any other logical grouping of computing resources (e.g., a neural network).

In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device or client node (102, 104). Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the system also includes a model coordinator (100). In one or more embodiments, the model coordinator (100) is operatively connected to the client nodes (102, 104). A model coordinator (100) may be separate from and connected to any number of client nodes (102, 104). In one or more embodiments, the model coordinator (100) is a computing device.

In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

The model coordinator (100), and components therein, are discussed further in the description of FIG. 1B, below.

In one or more embodiments, the client nodes (102, 104) and the model coordinator (100) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1A shows a configuration of components, other configurations may be used without departing from the scope of embodiments described herein. Accordingly, embodiments disclosed herein should not be limited to the configuration of components shown in FIG. 1A.

Figure 1B:
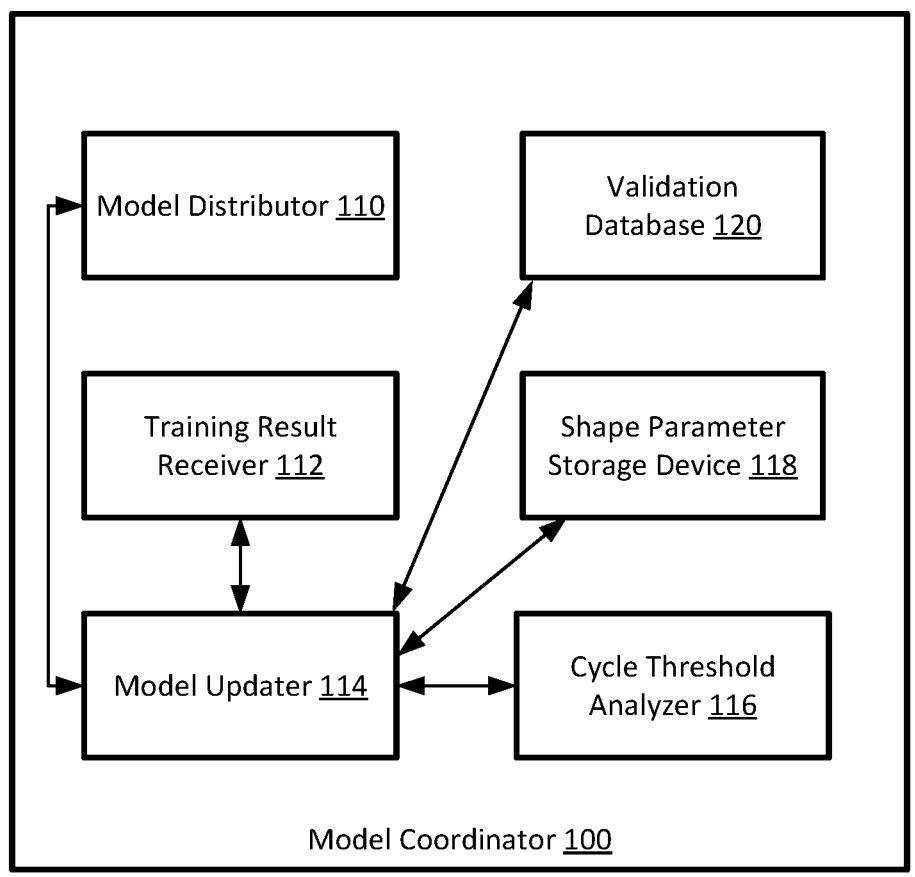
FIG. 1B shows a diagram of a model coordinator in accordance with one or more embodiments of the invention.

FIG. 1B shows a diagram of a model coordinator (100) in accordance with one or more embodiments described herein. The model coordinator (100) may include any number of components. As shown in FIG. 1B, the model coordinator (100) includes a model distributor (110), an training result receiver (112), a model updater (114), a cycle threshold analyzer (116), a shape parameter storage device (118), and a validation database (120). Each of these components is described below.

In one or more embodiments, a model coordinator (100) is a computing device, as discussed above in the description of FIG. 1A.

In one or more embodiments, the model coordinator (100) includes a model distributor (110). In one or more embodiments, a model distributor (110) is any hardware (e.g., circuitry), software, firmware, or any combination thereof that includes functionality to distribute models (e.g., initial models, updated models) generated by the model coordinator (100). In one or more embodiments, such a model may be transmitted via one or more network interfaces (not shown), and may be distributed on a recurring basis as part of a model training session. In one or more embodiments, the model distributed may be a gradient vector representing the results of aggregating model updates (i.e., gradient sign vectors) received from client nodes. In one or more embodiments, the model distributor (110) may also distribute any other information relevant to the model being distributed.

In one or more embodiments, the model coordinator (100) includes a training results receiver (112). In one or more embodiments, training results receiver (112) is any hardware (e.g., circuitry), software, firmware, or any combination thereof that includes functionality to obtain/receive model updates (i.e., gradient sign vectors) from client nodes. In one or more embodiments, model updates are obtained in any manner capable of collecting data from or about computing devices (e.g., via, at least in part, one or more network interfaces of the model coordinator (100)).

Such model updates may include, from any number of client nodes, gradient sign vectors that are a representation of the results of the model training performed by the client nodes. As described above, a gradient sign vector may be a vector with a set of single bit values, each representing the sign of one of the gradients of the gradient vector resulting from a model training cycle performed by a client node.

In one or more embodiments, the model coordinator (100) includes a model updater (114) operatively connected to the aforementioned model distributor (110) and the training results receiver (112). In one or more embodiments, a model updater (114) is any hardware (e.g., circuitry), software, firmware, or any combination thereof that includes functionality to use model updates received via the training results receiver (112) to update a model during a training session to be distributed back to client nodes via a model distributor (110). In one or more embodiments, updating a model includes assessing a set of model updates, assessing the index positions within the gradient sign vectors that represent the model updates, and for each index position using the values of that index position in the various gradient sign vectors and initial or updated shape parameters (e.g., $\alpha$ and $\beta$) to generate a model update. The function of the model updater (114) is discussed further in the description of FIG. 2, below.

In one or more embodiments, the model coordinator (100) includes a cycle threshold analyzer (116) operatively connected to the model updater (114). In one or more embodiments, a cycle threshold analyzer (116) is any hardware (e.g., circuitry), software, firmware, or any combination thereof that includes functionality to determine if a pre-set or configured threshold of cycles since the last time the model updater (114) used the initial shape parameter values have occurred. In one or more embodiments, if the cycle threshold has been reached, the cycle threshold analyzer (116) indicates to the model updater to use the initial shape parameters for the next cycle of the training epoch. As an example, if the cycle threshold is twenty, then after every twenty cycles, the cycle threshold analyzer may indicate to the model updater (114) to use an $\alpha$ and $\beta$ value of one for the next cycle when determining values for the model update based on that cycle.

In one or more embodiments, the model updater (114) is also operatively connected to a shape parameter storage device (118). In one or more embodiments, a shape parameter storage device is data storage of any type (e.g., a data repository, as described above), of a computing device (described above) that may be used to store shape initial shape parameter values and updated shape parameter values that have been updated based on a Bayesian update using the shape parameters from the previous cycle and the model updates (i.e., gradient sign vectors) of the current cycle In one or more embodiments, a validation database (120) is data storage of any type (e.g., a data repository, as described above), that is configured to store information that may be used in performing an analysis for a given model (e.g., an updated model provided by the model updater (114). Such information may include the results of past validation losses determined for previous iterations of a model, which may be used in a regression analysis to fit a curve to the validation losses and check the value of the slope of the curve. In one or more embodiments, the slope of the curve determines whether or not the model is generalizing well (i.e., whether or not it is overfitting the data).

While FIG. 1B shows a configuration of components, other configurations may be used without departing from the scope of embodiments described herein. For example, although FIG. 1B shows all components as part of the same device, any of the components may be grouped in sets of one or more components which may exist and execute as part of any number of separate and operatively connected devices. As another example, a single component may be configured to perform all or any portion of the functionality performed by the components shown in FIG. 1B. Accordingly, embodiments disclosed herein should not be limited to the configuration of components shown in FIG. 1B.

Figure 2:
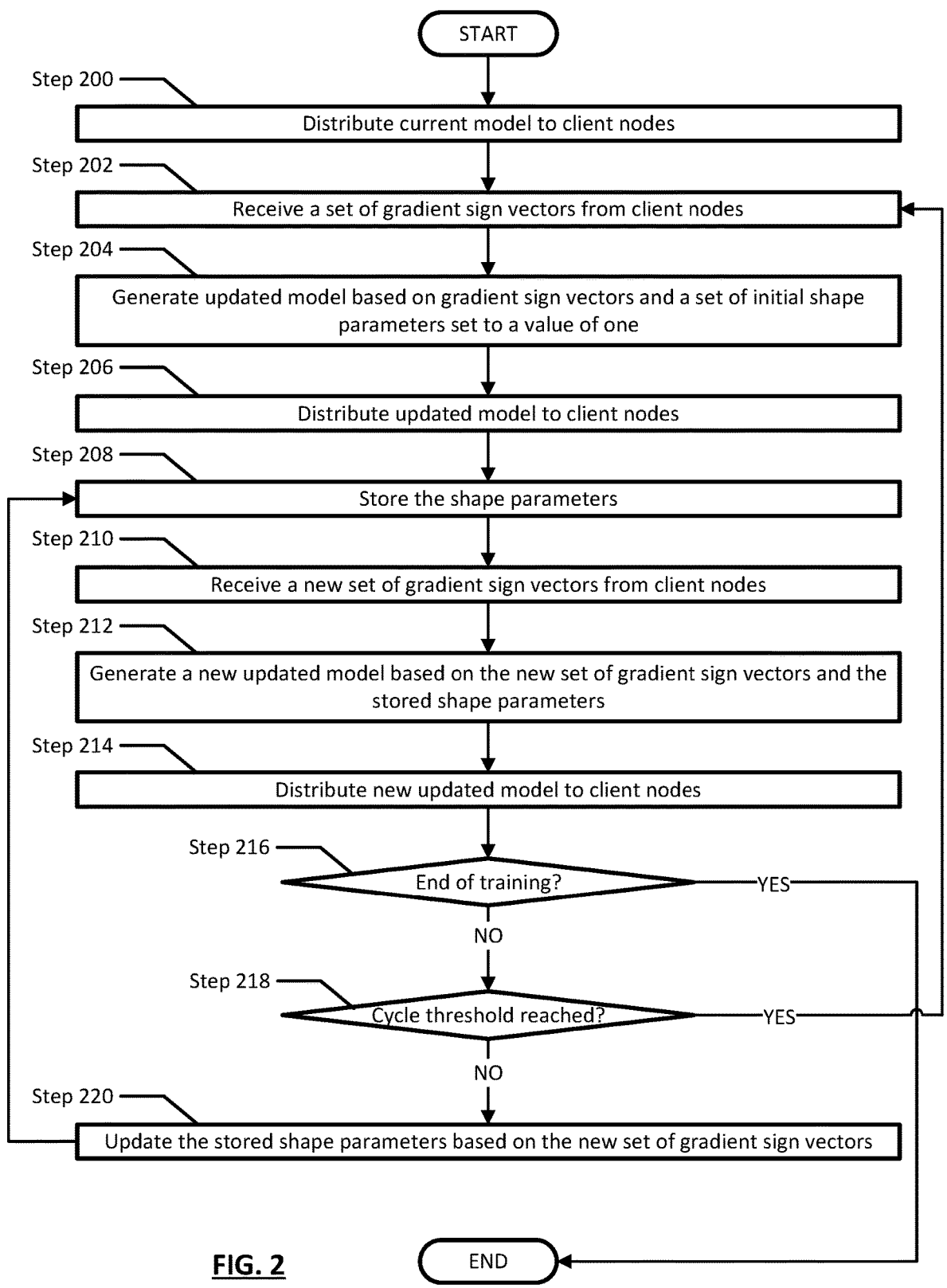
FIG. 2 shows a flowchart in accordance with one or more embodiments of the invention.

FIG. 2 shows a flowchart describing a method for compression switching during a training session in a federated learning environment in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 2.

In Step 200, a current model is distributed by a model coordinator to client nodes. In one or more embodiments, as described above, a model may be represented as a vector of values corresponding to a set of variables of a gradient vector. In one or more embodiments, if the current model is the initial model the values therein may be randomly initialized. In one or more embodiments, thereafter, during a training session, each subsequently distributed current model is an updated model generated as a result based on the gradient sign vectors or received from client nodes during a cycle of the training session. In one or more embodiments, the same current model is distributed to the client nodes. In one or more embodiments, the client nodes use their data to train the current model, which results in a gradient vector.

In Step 202, the model coordinator receives model updates from the client nodes. In one or more embodiments, the model updates are based on the gradient vectors generated by the client nodes after training the current model received in Step 200 using their data. The model update may be a gradient sign vector that includes a set of single bit values representing the signs of the gradients in the gradient vector.

In Step 204, an updated model is generated using the gradient sign vectors from the client nodes. In one or more embodiments, updating the model to obtain an updated model includes, for each gradient sign vector index position, obtaining the set of values at that index position from each of the gradient sign vectors. The values may be decoded to real numbers that are positive or negative. For example, zero may be decoded to negative one, and one may be decoded to positive one. A scaling factor (e.g., 0.1) may be applied to the decoded values without departing from the scope of embodiments described herein. In one or more embodiments, using Beta distribution shape parameters α and β of one, a value is determined for each index position, which is equivalent to finding the mean of the values for that position.

For example, for twenty gradient sign vectors, index position three may have twelve positive one values and eight negative one values. Using α and β of one, the equation for θ (the expected value to use as the result for the index position) becomes $S_1/N$, where, in this example, $S_1$ is the number of positive values, and N is the total number of client nodes and, therefore, gradient sign vectors from which values are used. Therefore, the value to be used as θ is $12/20=0.6$. $(2\times0.6)-1=0.2$, which is the expected value in the updated model at index position three. This is mathematically equivalent to taking the average of the twenty values at index position three, as $[[12\times(1)]+[8\times(-1)]]/20=0.2$.

In one or more embodiments, the above-described analysis is performed to determine an expected value for each index position, and the results are used to form a model update.

In Step 206, the updated model obtained in Step 206 is distributed to the client nodes. In one or more embodiments, the client nodes each use the updated model to perform another training cycle, each using client data available to that client.

In Step 208, the model coordinator stores the shape parameters α and β used in the calculation in Step 204, which at this point are one for each shape parameter at each index position.

In Step 210, a new set of gradient sign vectors are received at the model coordinator from the client nodes, representing the results of the latest training cycle.

In Step 212, a new updated model is generated using the values from the gradient sign vectors for each vector index position and the α and β values used for that index position for the previous model update calculation. In one or more embodiments, the number of instances of one sign (e.g., positive) are added to α, and the number of instances of the other sign (e.g., negative) are added to β to obtain the α and β for use in the next cycle. Additionally, the number of instances of the sign added to α and the total number of values are used to calculate a new θ, which, in turn is used to calculate a new expected value for use at a given index position in the new model update.

Continuing the above example of twenty client nodes, if the most recent cycle yielded two instances of positive one, and eighteen instances of negative one, then $θ=(1+2-1)/(1+1+20-2)=0.15$. The expected value then becomes $[(2\times0.15)-1]=-0.7$. One of ordinary skill in the art will appreciate that this value is different from the mean obtained using the same values, which would be:

(2+(−18))/2=−0.8.

In one or more embodiments, the above-described analysis is performed to determine an expected value for each index position, and the results are used to form a new model update.

In Step 214, the new model update is distributed to the client nodes. In one or more embodiments, the client nodes each use the updated model to perform another training cycle, each using client data available to that client.

In Step 216, a determination is made as to whether the training has ended. In one or more embodiments, the training may end after a pre-determined number of cycles or epochs has occurred. Additionally or alternatively, training may end when a determination is made that the model has reached a desired level of ability to generalize to produce correct results from previously unseen inputs. In one or more embodiments, the training is complete, the process ends. In one or more embodiments, if training is not complete, then the method proceeds to Step 218.

In Step 218, a determination is made as to whether a cycle threshold has been reached. In one or more embodiments, if a cycle threshold has been reached, then the method returns to Step 202, a set of gradient sign vectors is received, and Step 204 is performed to generate an updated model using the initial shape parameters (i.e., α and β equal one). In one or more embodiments, if the cycle threshold has not been reached, the method continues to Step 220.

In Step 220, the shape parameters are updated. In one or more embodiments, for each gradient position, the number of instances of one sign (e.g., positive) in the new are added to α, and the number of instances of the other sign (e.g., negative) are added to β to obtain the α and β for use in the next cycle for a given gradient position. In one or more embodiments, the method returns to Step 208, and the updated shape parameters for each index position are stored. The method then repeats Steps 210-214 to generate and distribute a new model to the client nodes.

Example Use Case

The above describes systems and methods for generating model updates used during training of a machine learning algorithm in a federated learning environment. Such embodiments are intended to scale for use in model training scenarios that produce gradient vectors with any number of gradient value elements (e.g., hundreds, thousands, millions, billions, etc.). However, for the sake of brevity and simplicity, consider the following scenario to illustrate the concepts described herein.

A model coordinator is configured to perform federated learning services in conjunction with 10 client nodes, with each node being a neural network with a number of layers between the input layer and the output layer. In such a scenario, an initial model is sent to the client nodes to begin a training cycle. Each client node executes a gradient descent algorithm to train the model on its own private data. The output of the training is a gradient vector that includes 10 gradients corresponding to 10 variables relevant to predicting an output based on input data. In other words, the gradient vector has 10 elements.

To send a gradient vector with 10 values, each represented by a 32 bit data item would require 320 bits of data. To do so from each of 10 nodes would require 3200 bits of data to be sent to the model coordinator.

Instead of the actual value of the gradients in the gradient vector, each client node is initially configured to send only the signs of the gradient values, with negative gradients represented by a 0, and positive gradient values (and a value of zero) represented by a 1.

For example, a given client node may produce a gradient vector for a given cycle during the training session, such as:

{−1.500;9.200;−1.600;0.027;−4.300;−1.700;2.300;−6.420;2.188;−0.075}

Using the sign compressor, the gradient sign vector becomes:

{0;1;0;1;0;0;1;0;1;0}

Thus, the information transmitted per client node to communicate results of a model training as a model update has been reduced by a factor of 32, from 320 bits to 10 bits. Each of the 10 client nodes similarly transmits a 10 element gradient sign vector to the model coordinator.

To perform the analysis, the model coordinator takes the set of values from the first cycle of training for a given gradient sign vector index position from each of the 10 nodes. In this example, the set of values for the first gradient sign vector position from each of the 10 client nodes includes six positive values and four negative values. The model coordinator also uses α and β equal to one. As such, θ is calculated by the model coordinator as 6/10=0.6. The expected value then becomes [(2×0.6)−1]=0.2, which is equivalent to the mean value (i.e., also 0.2).

For the next cycle, the model coordinator again takes the set of values from the first gradient sign vector position from the gradient sign vectors received from the client nodes after they complete the second cycle, which includes eight positive values and two negative values. Using this information, and the previous α and β of 1, θ is calculated to be (1+8−1)/(1+1+10−2)=8/10=0.8. The expected value then becomes [(2×0.8)−1]=0.6. Additionally, a is updated and stored as (1+8)=9, and β is updated and stored as (1+3)=4.

For the next cycle, the model coordinator again takes the set of values from the first gradient sign vector position from the gradient sign vectors received from the client nodes after they complete the third cycle, which includes four positive values and six negative values. Using this information, and the previous α of 9 and β of 4, θ is calculated to be (9+4−1)/(9+4+10−2)=12/21=0.57 (approximate). The expected value then becomes [(2×0.57)−1]=0.14.

In one or more embodiments, similar calculations are performed for each cycle and each vector index position to produce updated models after each cycle, until a cycle threshold is reached. In this example, empirical evidence has shown that a cycle threshold of 10 results in stronger generalization for the model, as well as faster convergence times. Therefore, the process repeats, with updates to α and β for 10 cycles. After the tenth cycle, a and β are again set to one, and the process repeats for another 10 cycles. The training epoch is pre-set to last for 100 cycles, leading to 10 sets of 10 cycles using the described process to produce a final model for use by the client nodes to predict outcomes for the relevant scenario for which the training occurred.

Figure 3:
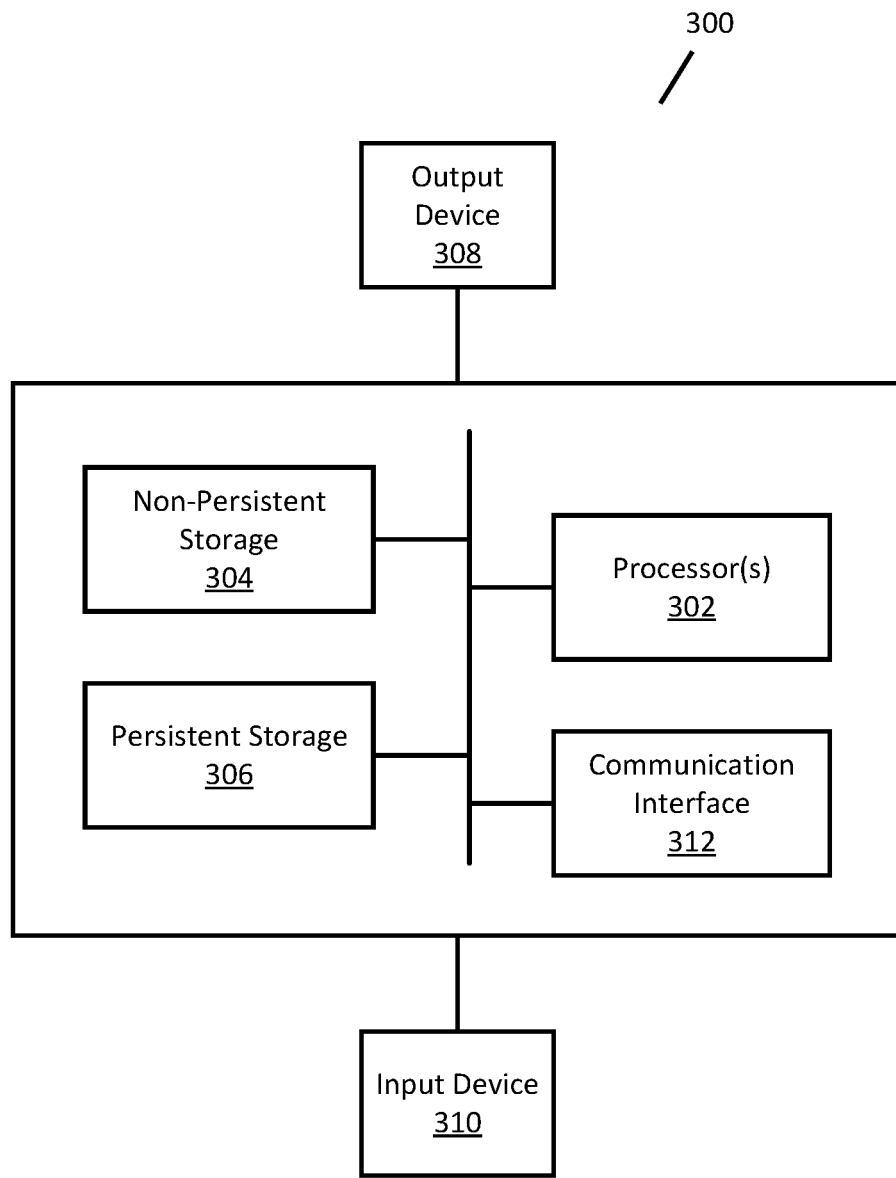
FIG. 3 shows a computing system in accordance with one or more embodiments of the invention.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for model updating in a federated learning environment, the method comprising:
distributing, by a model coordinator, a current model with index positions to a plurality of physical client nodes comprising a plurality of neural networks, wherein the current model is trained on the plurality of neural networks using private data in the plurality of physical client nodes producing a gradient vector in each of the plurality of physical client nodes;
receiving, by the model coordinator and in response to distributing the current model, a first set of gradient sign vectors, wherein;
each gradient sign vector of the first set of gradient sign vectors is received from one physical client node of the plurality of physical client nodes,
each gradient sign vector of the first set of gradient sign vectors is based on a sign of the gradient vector for each of the index positions generated by respective physical client nodes of the plurality of physical client nodes using the current model, and
each gradient sign vector initially has a value of zero if the gradient vector is a negative number and a value of one if the gradient vector is zero or a positive number to compress an amount of information transmitted to the model coordinator from each physical client node by compressing each index position to a single bit, which reduces a network bandwidth necessary to transmit the first set of gradient sign vectors;
generating, by the model coordinator, a first updated model by using a Bayesian Beta-Bernoulli model to determine an expected value for each of the index positions with inputs comprising the first set of gradient sign vectors, a first shape parameter, and a second shape parameter;
distributing the first updated model to the plurality of physical client nodes;

storing, by the model coordinator, the first shape parameter and the second shape parameter;

receiving, by the model coordinator and in response to distributing the first updated model, a second set of gradient sign vectors, wherein each gradient sign vector of the second set of gradient sign vectors is received from one physical client node of the plurality of physical client nodes;

generating, by the model coordinator, a second updated model based on the second set of gradient sign vectors, the first shape parameter, and the second shape parameter; and distributing the second updated model to the plurality of physical client nodes.

2. The method of claim 1, further comprising:

updating the first shape parameter using a set of gradient sign values at a gradient sign vector index position within the second set of gradient sign vectors to obtain an updated first shape parameter in a Bayesian update;

updating the second shape parameter using the set of gradient sign values at the gradient sign vector index position within the second set of gradient sign vectors to obtain an updated second shape parameter in a Bayesian update;

receiving, by the model coordinator and in response to distributing the second updated model, a third set of gradient sign vectors, wherein each gradient sign vector of the third set of gradient sign vectors is received from one physical client node of the plurality of physical client nodes; and generating, by the model coordinator, a third updated model using the second set of gradient sign vectors, the updated first shape parameter, and the updated second shape parameter.

3. The method of claim 2, wherein:

updating the first shape parameter using the set of gradient sign values comprises adding a quantity of positive gradient sign values of the set of gradient sign values to the first shape parameter, and updating the second shape parameter using the set of gradient sign values comprises adding a quantity of negative gradient sign values of the set of gradient sign values to the second shape parameter.

4. The method of claim 2, further comprising:

making a determination, by the model coordinator and after distributing the second updated model, that a cycle threshold is reached;

discarding, based on the determination, the updated first shape parameter and the updated second shape parameter; and using the first shape parameter, the second shape parameter, and a next set of gradient vectors from the plurality of physical client nodes to generate the next updated model.

5. The method of claim 1, wherein, when the current model is an initial model, generating the first updated model comprises:

calculating an average gradient index position value for each gradient index position of the first updated model using the first set of gradient sign vectors.

6. The method of claim 1, further comprising, before generating the first updated model:

decoding each gradient sign vector of the first set of gradient sign vectors to include only non-zero real numbers to obtain a set of decoded gradient sign vectors, wherein the model coordinator generates the first updated model using the set of decoded gradient sign vectors.

7. The method of claim 1, wherein the first shape parameter and the second shape parameter are equal to one.

8. The method of claim 1, wherein prior to generating a first updated model, each gradient sign vector of the first set of gradient sign vectors is decoded where a value of zero is changed to negative one and a value of one is changed to positive one.

9. A non-transitory computer readable medium comprising computer readable program code, which when executed by a computer processor enables the computer processor to perform a method for model updating in a federated learning environment, the method comprising:

distributing, by a model coordinator, a current model with index positions to a plurality of physical client nodes comprising a plurality of neural networks, wherein the current model is trained on the plurality of neural networks using private data in the plurality of physical client nodes producing a gradient vector in each of the plurality of physical client nodes;

receiving, by the model coordinator and in response to distributing the current model, a first set of gradient sign vectors, wherein:

each gradient sign vector of the first set of gradient sign vectors is received from one physical client node of the plurality of physical client nodes, each gradient sign vector of the first set of gradient sign vectors is based on a sign of the gradient vector for each of the index positions generated by respective physical client nodes of the plurality of physical client nodes using the current model, and each gradient sign vector initially has a value of zero if the gradient vector is a negative number and a value of one if the gradient vector is zero or a positive number to compress an amount of information transmitted to the model coordinator from each physical client node by compressing each index position to a single bit, which reduces a network bandwidth necessary to transmit the first set of gradient sign vectors;

generating, by the model coordinator, a first updated model by using a Bayesian Beta-Bernoulli model to determine an expected value for each of the index positions with inputs comprising the first set of gradient sign vectors, a first shape parameter, and a second shape parameter;

distributing the first updated model to the plurality of physical client nodes;

storing, by the model coordinator, the first shape parameter and the second shape parameter;

receiving, by the model coordinator and in response to distributing the first updated model, a second set of gradient sign vectors, wherein each gradient sign vector of the second set of gradient sign vectors is received from one physical client node of the plurality of physical client nodes;

generating, by the model coordinator, a second updated model based on the second set of gradient sign vectors, the first shape parameter, and the second shape parameter; and distributing the second updated model to the plurality of physical client nodes.

10. The non-transitory computer readable medium of claim 9, wherein the method performed by executing the computer readable program code further comprises:

updating the first shape parameter using a set of gradient sign values at a gradient sign vector index position within the second set of gradient sign vectors to obtain an updated first shape parameter in a Bayesian update;

updating the second shape parameter using the set of gradient sign values at the gradient sign vector index position within the second set of gradient sign vectors to obtain an updated second shape parameter in a Bayesian update;

receiving, by the model coordinator and in response to distributing the second updated model, a third set of gradient sign vectors, wherein each gradient sign vector of the third set of gradient sign vectors is received from one physical client node of the plurality of physical client nodes; and generating, by the model coordinator, a third updated model using the second set of gradient sign vectors, the updated first shape parameter, and the updated second shape parameter.

11. The non-transitory computer readable medium of claim 10, wherein:

updating the first shape parameter using the set of gradient sign values comprises adding a quantity of positive gradient sign values of the set of gradient sign values to the first shape parameter, and updating the second shape parameter using the set of gradient sign values comprises adding a quantity of negative gradient sign values of the set of gradient sign values to the second shape parameter.

12. The non-transitory computer readable medium of claim 10, wherein the method performed by executing the computer readable program code further comprises:

making a determination, by the model coordinator and after distributing the second updated model, that a cycle threshold is reached;

discarding, based on the determination, the updated first shape parameter and the updated second shape parameter; and using the first shape parameter, the second shape parameter, and a next set of gradient vectors from the plurality of physical client nodes to generate the next updated model.

13. The non-transitory computer readable medium of claim 9, wherein, when the current model is an initial model, generating the first updated model comprises:

calculating an average gradient index position value for each gradient index position of the first updated model using the first set of gradient sign vectors.

14. The non-transitory computer readable medium of claim 9, wherein the method performed by executing the computer readable program code further comprises, before generating the first updated model:

decoding each gradient sign vector of the first set of gradient sign vectors to include only non-zero real numbers to obtain a set of decoded gradient sign vectors, wherein the model coordinator generates the first updated model using the set of decoded gradient sign vectors.

15. The non-transitory computer readable medium of claim 9, wherein the first shape parameter and the second shape parameter are equal to one.

16. The non-transitory computer readable medium of claim 9, wherein prior to generating a first updated model, each gradient sign vector of the first set of gradient sign vectors is decoded where a value of zero is changed to negative one and a value of one is changed to positive one.

17. A system for model updating in a federated learning environment, the system comprising:

a model coordinator, executing on a processor comprising circuitry, and configured to:

distribute a current model with index positions to a plurality of physical client nodes comprising a plurality of neural networks, wherein the current model is trained on the plurality of neural networks using private data in the plurality of physical client nodes producing a gradient vector in each of the plurality of physical client nodes;

receive, in response to distributing the current model, a first set of gradient sign vectors, wherein:

each gradient sign vector of the first set of gradient sign vectors is received from one physical client node of the plurality of physical client nodes, each gradient sign vector of the first set of gradient sign vectors is based on a sign of the gradient vector for each of the index positions generated by respective physical client nodes of the plurality of physical client nodes using the current model, and each gradient sign vector initially has a value of zero if the gradient vector is a negative number and a value of one if the gradient vector is zero or a positive number to compress an amount of information transmitted to the model coordinator from each physical client node by compressing each index position to a single bit, which reduces a network bandwidth necessary to transmit the first set of gradient sign vectors;

generate a first updated model by using a Bayesian Beta-Bernoulli model to determine an expected value for each of the index positions with inputs comprising the first set of gradient sign vectors, a first shape parameter, and a second shape parameter;

distribute the first updated model to the plurality of physical client nodes;

store the first shape parameter and the second shape parameter;

receive, in response to distributing the first updated model, a second set of gradient sign vectors, wherein each gradient sign vector of the second set of gradient sign vectors is received from one physical client node of the plurality of physical client nodes;

generate a second updated model based on the second set of gradient sign vectors, the first shape parameter, and the second shape parameter; and distribute the second updated model to the plurality of physical client nodes.

18. The system of claim 17, wherein the model coordinator is further configured to:

update the first shape parameter using a set of gradient sign values at a gradient sign vector index position within the second set of gradient sign vectors to obtain an updated first shape parameter in a Bayesian update;

update the second shape parameter using the set of gradient sign values at the gradient sign vector index position within the second set of gradient sign vectors to obtain an updated second shape parameter in a Bayesian update;

receive, by the model coordinator and in response to distributing the second updated model, a third set of gradient sign vectors, wherein each gradient sign vector of the third set of gradient sign vectors is received from one physical client node of the plurality of physical client nodes; and generate, by the model coordinator, a third updated model using the second set of gradient sign vectors, the updated first shape parameter, and the updated second shape parameter.

19. The system of claim 18, wherein the model coordinator is further configured to:
make a determination, after distributing the second updated model, that a cycle threshold is reached;
discard, based on the determination, the updated first shape parameter and the updated second shape parameter; and
use the first shape parameter, the second shape parameter, and a next set of gradient vectors from the plurality of physical client nodes to generate the next updated model.

20. The system of claim 17, wherein the first shape parameter and the second shape parameter are equal to one.

* * * * *